United States Patent [19]
Hakamada et al.

[11] Patent Number: 5,388,614
[45] Date of Patent: Feb. 14, 1995

[54] ROTARY FLOW CONTROL VALVE

[75] Inventors: Naoki Hakamada, Okazaki; Yoriaki Ando, Kariya, both of Japan

[73] Assignee: Nippon Soken, Inc., Nishio, Japan

[21] Appl. No.: 125,835

[22] Filed: Sep. 24, 1993

[30] Foreign Application Priority Data

Sep. 25, 1992 [JP] Japan .................................. 4-256931

[51] Int. Cl.$^6$ ............................................. F16K 31/04
[52] U.S. Cl. ........................... 137/625.65; 137/625.24; 251/129.09
[58] Field of Search ....................... 137/625.24, 625.65; 251/129.09, 129.12

[56] References Cited

U.S. PATENT DOCUMENTS

| | | | |
|---|---|---|---|
| 4,621,660 | 11/1986 | Klocke | 251/129.09 X |
| 4,735,233 | 4/1988 | Nogami et al. | 137/625.65 |
| 4,977,816 | 12/1990 | Kuttruf | 137/625.24 X |

FOREIGN PATENT DOCUMENTS

| | | |
|---|---|---|
| 61-153073 | 7/1986 | Japan . |
| 62-42217 | 10/1987 | Japan . |
| 62-170803 | 10/1987 | Japan . |

*Primary Examiner*—Robert G. Nilson
*Attorney, Agent, or Firm*—Cushman, Darby & Cushman

[57] ABSTRACT

A rotary flow control valve is provided, that, despite compact design, offers excellent vibration resistance, a high response speed, and superb proportionality of a controlled flow rate to an applied current value. In a channel selector 4 in a rotary flow control valve 1, a guide valve 2 mounted in a hollow of an inner housing 6 is borne by bearings 19 and 20 so that the guide valve 2 can rotate forward or in reverse. Intra-outer housing tubes 10, 11, and 12 are formed in an outer housing 5. In the inner housing 6, communicating channels 13 to 16 are formed in fours at symmetric positions with respect to the rotation center of the guide valve 2. In a torque motor 3, permanent magnets 33 are attached to a lower armature 32 coupled with the guide valve 2 using an adhesive. The magnetic poles at both ends of the permanent magnets 33 are opposed to cylinders 43 about which coils 34 are wound. With attraction and repulsion produced between the cylinders 43 and permanent magnets 33, the guide valve 2 rotates together with the lower armature 32.

8 Claims, 10 Drawing Sheets

ROTARY FLOW CONTROL VALVE

BACKGROUND OF THE INVENTION

1. Field of the Invention

The present invention relates to a flow control valve in which channels are switched by varying an applied current, and thus a flow rate is controlled.

2. Description of the Related Art

In the past, a linear motion-type electromagnetic proportional flow control valve, in which a spool slides axially in proportion to an applied current value, has been proposed as one type of electromagnetic flow control valve for controlling a flow rate of fluid according to an applied current value. Another flow control value is of the rotary motion type, wherein a valve is installed in a housing and a flow rate is controlled by rotating the valve with a motor.

The foregoing linear motion-type electromagnetic flow control value has an advantage that a flow rate can be controlled in proportion to an applied current. When mounted in an automobile, however, the flow control valve is likely to operate incorrectly because of the axial oscillation of the spool, and cannot control a flow rate with precision.

In contrast, the conventional rotary motion-type flow control value is unaffected by the above oscillation. However, since a large drive motor is needed, the control valve itself is large in size. The adoption of a structure, in which a reduction gear is employed to increase a rotary torque, enables the use of a small motor. However, the deceleration decreases response speed, disabling high-speed flow control.

When the above motor is used, a torque variation in a direction defined by a rotation angle, which is attributable to the non-uniform distribution of magnetic fields in the direction defined by a rotation angle of the motor, leads to poor linearity of the rotation angle relative to an applied current and eventually to the poor proportionality of a flow rate of controlled liquid relative to the applied current.

SUMMARY OF THE INVENTION

Accordingly, an object of the present invention is to provide an electromagnetic proportional flow control valve of a rotary type that despite a compact design, offers excellent vibration proof, a high response speed, and superb proportionality of a controlled flow rate to an applied current value.

To achieve the above object, a rotary flow control value in the first mode relating to the present invention comprises a housing having a cylindrical space and multiple communicating channels for communicating with the cylindrical space, a valve that is located in the cylindrical space and has switch channels for selectively canalizing the communicating channels in the housing, bearings that are located in the cylindrical space and bear the valve so that the valve can rotate forward or in reverse with respect to the axial line thereof, rotary members coupled with the valve and extended in directions perpendicular to the axial line of the valve, magnets located away from the rotation center in the rotary members, magnetic members opposed to the magnetic poles of the magnets, and coils that are wound about the magnetic members and change the magnetic poles and magnetic forces of the magnetic members according to the orientation and electrical size of applied current. Attraction and repulsion are produced between the magnetic members and magnets, thus rotating the rotary members.

A rotary flow control valve in the second mode relating to the present invention comprises a housing having a cylindrical space and multiple communicating channels communicating with the cylindrical space, a valve that is located in the cylindrical space and has switch channels for selectively canalizing the communicating channels in the housing, bearings that are located in the cylindrical space and bear the valve so that the valve can rotate forward or in reverse with respect to the axial line thereof, a rotary member coupled to the valve, extended in a direction perpendicular to the axial line of the valve, and made of a magnetic substance, coils through which the rotary member penetrates in a hollow and which change the magnetic poles and magnetic force of the rotary member according to the orientation and electrical size of applied current, and magnets opposed to the magnetic poles of the rotary member. Attraction and repulsion are produced between the rotary member and magnets, thus rotating the rotary member.

In the rotary flow control valve relating to the present invention, an effort has been made to resolve the problem that the linearity of a rotation angle relative to an applied current is unsatisfactory: permanent magnets are attached to the distal parts of one of rotary members that rotate a rotary valve and extend in directions perpendicular to the axial line passing through the rotation center of the rotary valve, or a rotary member itself is made of a magnetic substance, and coils are wound about the magnetic substance. Herein, other members that are magnetic substances about which coils are wound or other permanent magnets are located in a holder and opposed to the permanent magnets or magnetic substance. The distribution of magnetic fields occurring between the opposed magnetic substances and permanent magnets is quite uniform. The variation in the magnetic field within the operating range of a rotary member shrinks accordingly. This results in excellent linearity in a rotation angle of a rotary member relative to an applied current.

As a result, the rotary flow control valve can offer excellent vibration proofing and highly responsive speed despite its compact design.

DETAILED DESCRIPTION OF THE PREFERRED EMBODIMENTS

Figure 1:
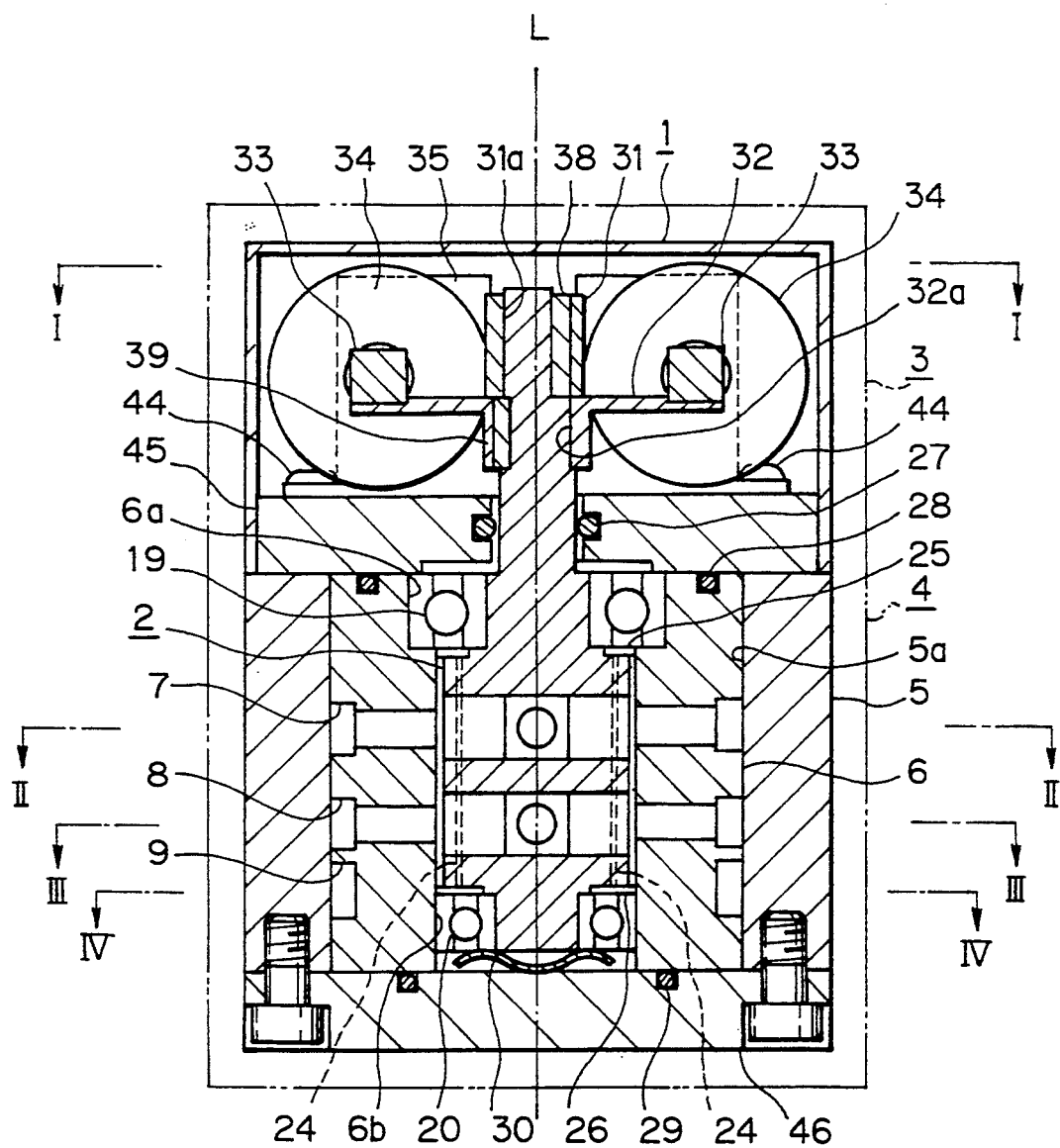
FIG. 1 is a longitudinal sectional view showing the components of a rotary flow control valve of the first embodiment.

Embodiments of a rotary flow control valve relating to the present invention will be described in detail with reference to the drawings.

FIGS. 1 to 5 show an embodiment of a rotary flow control valve relating to the present invention in the first mode. In the drawings, a rotary flow control valve comprises:

a housing 5 having a cylindrical space 6a and a plurality of communicating channels 13 to 15 extending from the side wall of the housing and communicating with the cylindrical space;

a valve located in the cylindrical space 6a and provided with switch channels 21 and 22 for selectively canalizing the communicating channels in the housing 5;

bearings that are located in the cylindrical space 6 and bear the valve so that the valve can rotate forward or in reverse with respect to the axial line L thereof;

rotary members 31 and 32 coupled with the valve 2 and extended in directions perpendicular to the axial line L of the valve 2;

magnets 33 located away from the rotation center on one of the rotary members 31 and 32;

magnetic members 43 opposed to the magnetic poles of the magnets 33; and coils 34 that are wound about the magnetic members 43 and change the magnetic poles and forces of the magnetic members according to the orientation and electrical size of applied current.

In the rotary flow control valve, attraction and repulsion are produced between the magnetic members 43 and magnets 33 in order to rotate the rotary members 31 and 32.

In a rotary flow control valve 1 in the first mode having the foregoing components, magnetic poles occur in the magnetic members 43 according to a current applied to the coils 34. Attraction and repulsion, whose intensities depend on the electrical size of applied current, are produced between the magnetic poles of the magnetic members 43 and those of the magnets 33 opposed to the magnetic members 43. The attraction and repulsion are produced away from the rotation center of the valve. A torque is then applied to the rotary members.

The magnetic poles of the magnets are opposed to the magnetic poles occurring on the end surfaces of the magnetic members owing to coils. The whole of magnetic flux can therefore be used to generate magnetic force, whereby a large torque is available despite a compact design. According to the aforesaid structure, the magnetic poles of the magnets and those produced by the coils are arranged substantially linearly. The distribution of the magnetic fields induced by the magnetic poles are therefore quite uniform. The operating range of each rotary member is within a very small portion of the magnetic field induced by the magnetic poles of the coils in the vicinity of the center of the magnetic field. The variations in the magnetic field within the operating range shrinks, which improves the linearity of a rotation angle of each rotary member relative to an applied current value. In other words, the rotation angle of the valve exhibits excellent linearity irrespectively of an applied current, which improves the proportionality of a controlled flow rate to an applied current value.

When the valve rotates together with the rotating members, the ports of any of the groups of communicating channels in the housing communicate with the ports of either of the switch channels in the valve. More particularly, with the rotation of the valve, the channels formed in the housing are switched. When the ports of any of the groups of communicating channels in the housing communicate with the ports of either of the switch channels in the valve, the total area shared by the ports of the communicating channels and the ports of the switch channel varies depending on the rotation angle of the valve. This enables control of a flow rate.

In the first mode, an even number of channels communicating with the cylindrical space in the housing may be arranged symmetrically with respect to the rotation center of the valve.

In the first mode, the cylindrical space in the housing may have the same diameter throughout the axial line.

In the first mode, the valve may be borne by at least two bearings. Supporting spaces in which the bearings are supported may communicate with each other via the communicating channels formed in the valve.

In the second mode of the present invention, as shown in FIGS. 1 to 4, and 14, a rotary flow control valve comprises:

a housing 5 having a cylindrical space 6a and a plurality of communicating channels 13 to 15 extending from the side wall of the housing and communicating with the cylindrical space;

a valve 2 located in the cylindrical space 6a and provided with switch channels 21 and 22 for selectively canalizing the communicating channels 13 to 15 in the housing 5;

bearings 19 and 20 that are located in the cylindrical space 6a and bear the valve 2 so that the valve 2 can rotate forward or in reverse with the axial line thereof L as a center;

a rotary member 91 coupled with the valve 2, extended in a direction perpendicular to the axial line L of the valve 2, and made of a magnetic substance;

coils 92 through which the rotary member 91 penetrates in a hollow and that change the magnetic poles and force of the rotary member according to the orientation and electrical size of applied current; and magnets 95 opposed to the magnetic poles of the rotary member 91.

In the rotary flow control valve, attraction and repulsion are produced between the rotary member 91 and magnets 95, thus rotating the rotary member 91.

In a rotary flow control valve 1 in the second mode, magnetic poles occur in the rotary member 91 according to a current applied to the coils 92. Attraction and repulsion whose intensities depend on the electrical size of applied current are produced between the magnetic poles of the rotary member 91 and those of the magnets 95 opposed to the magnetic poles of the rotary member 91. The attraction and repulsion are produced away from the rotation center of the valve, whereby a torque is applied to the rotary member 91. The operating range of the rotary member is within a limited portion of the magnetic field induced by the magnetic poles occurring in the coils 92 in the vicinity of the center of the magnetic field. The variation in the magnetic field within the operating range is limited, which results in excellent linearity of the rotation angle of the rotary member 10 relative to an applied current value. In short, the rotation angle of the valve demonstrates excellent linearity irrespectively of an applied current value, which leads to the improved proportionality of a controlled flow rate to an applied current value.

In the second mode, similarly to the first mode, the valve rotates together with the rotary member, and the channels formed in the housing are switched.

The valve is borne directly by the bearings, which eliminates a problem in a conventional rotary flow control valve that hydraulic lock occurs readily to cause an operation failure with the application of a high pressure. Smooth operation can therefore be guaranteed all the time.

An even number of channels communicating with the cylindrical space in the housing may be arranged symmetrically with respect to the rotation center of the valve.

The cylindrical space in the housing may have the same diameter throughout the axial line.

The valve may be borne by at least two bearings. Supporting spaces in which the bearings are supported communicate with each other via the communicating channels formed in the valve.

When an even number of channels communicating with the cylindrical space in the housing are located symmetrically with respect to the rotation center of the valve, a flow rate controllable with the same structure will be raised with the increase in the number of channels. This results in a compact valve. The pressures with which fluid is distributed to the channels are balanced, which eliminates the possibility of the valve being pushed against the housing and failing to operate.

The bearings are fixed directly to the housing. The bearing boxes, in which the bearings lie, and the cylindrical space, in which the valve is mounted, are therefore aligned to be readily coaxial in the process of machining. A problem relating to an error in mounting precision occurring in a structure, in which the bearings are provided separately from the housing, can therefore be eliminated. The clearance between the housing and valve can therefore be reduced, which results in a small leakage of fluid. The consumption of fluid decreases and the load to a pump for feeding fluid with pressure diminishes. The bearing boxes may have the same diameter as the cylindrical space in the housing, which obviates the necessity of the coaxial alignment but further improves precision. The improved machining precision and mounting precision lead to minimized clearance between the inner wall of the housing and the valve. This means that an amount of fluid leaking out of the clearance decreases.

When at least two bearings are used to bear the valve and supporting spaces in which the bearings are held to communicate with each other via communicating channels in the valve, the pressures in the supporting spaces containing the bearings are equalized owing to the communicating channels. As a result, the loads on the bearings are minimized. This enables smooth rotation of the bearings.

First embodiment

The first embodiment of the present invention will be described in conjunction with the drawings.

FIG. 1 is a longitudinal-sectional view showing the components of a rotary flow control value of the first embodiment relating to the first mode. As shown in FIG. 1, a rotary flow control valve 1 comprises a torque motor 3 and a channel selector 4. In the channel selector 4, an inner housing 6 is locked in a hollow 5a of an outer housing 5. The inner housing 6 is shaped like a hollowed cylinder, having a large-diameter hollow 6a and a small-diameter hollow 6b which serve as a cylindrical space. Bearings 19 and 20 are held in the large-diameter hollow 6a and small-diameter hollow 6b in the inner housing 6.

In an art in which the bearings 19 and 20 are attached to upper and lower plates 45 and 46, the plates 45 and 46, and the hollow of the housing 6 must have the same cylindrical shape and be precisely assembled into a unit. The integrated precision is counted on. For inserting a guide valve 2 into the hollow of the housing 6 and assembling all the components, a large clearance must be created beforehand between the guide valve 2 and the housing 6. Otherwise, assembly cannot be carried out. However, according to the present invention, as long as the hollows 6a and 6b in the housing 6 have the same cylindrical shape and align axially with each other, the guide valve 2 can be mounted with precision. Thus, the mounting precision improves drastically and the clearance between the guide valve 2 and housing 6 becomes smaller.

The substantially cylindrical guide valve 2 serving as a valve is borne by the bearings 19 and 20 so that the guide valve 2 can rotate forward or reversely. Reference L in FIG. 1 denotes an axial line of the guide valve 2.

Figure 2:
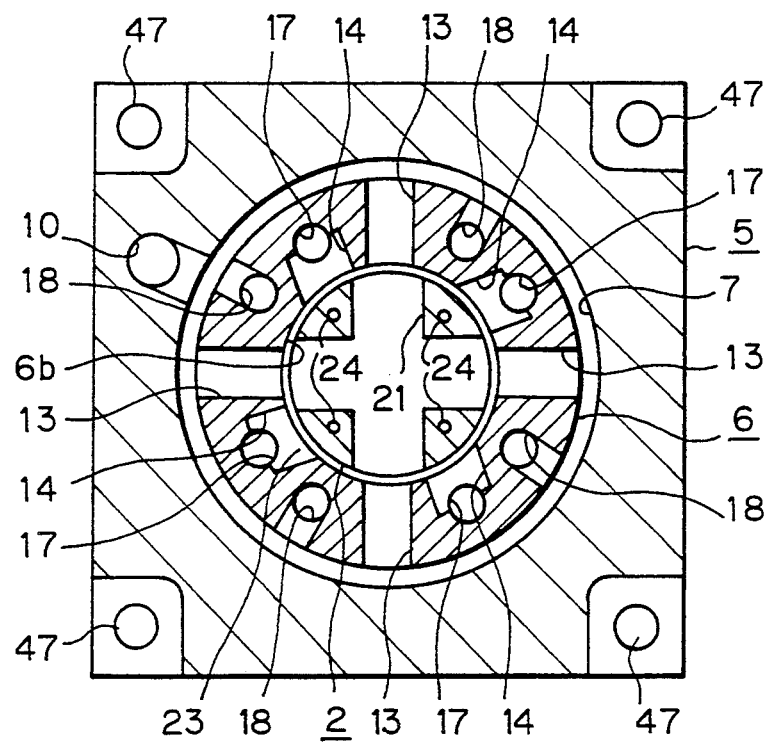
FIG. 2 shows a II—II cross section of FIG. 1.
Figure 3:
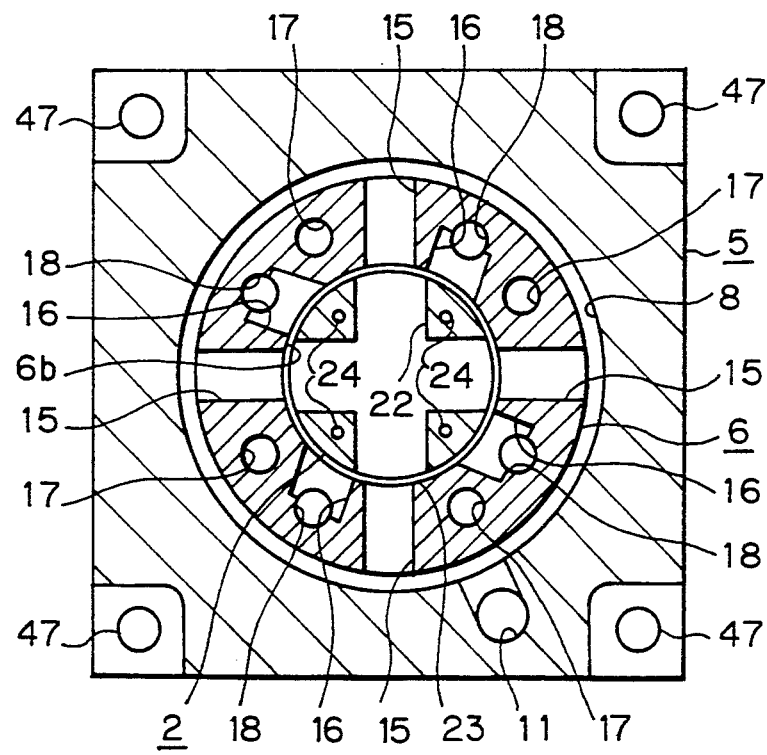
FIG. 3 shows a III—III cross section of FIG. 1.
Figure 4:
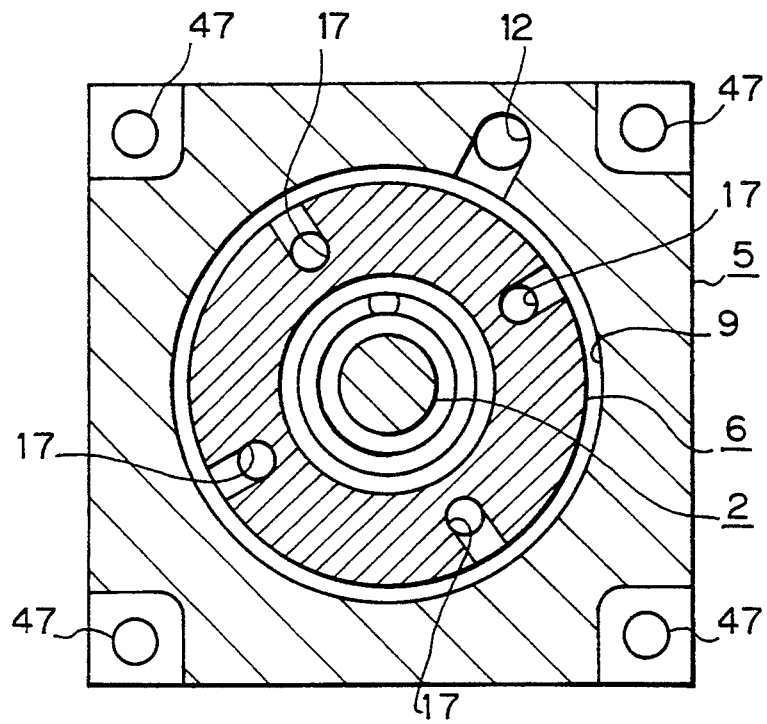
FIG. 4 shows a IV—IV cross section of FIG. 1.

Annular ditches 7, 8, and 9 are formed in three stages vertically on the outer circumference of the inner housing 6. FIGS. 2, 3, and 4 show a II—II cross section containing the annular ditch 7 in the upper stage, a III—III cross section containing the annular ditch 8 in the middle stage, and a IV—IV cross section containing the annular ditch 9 in the lower stage respectively.

As shown in FIG. 2, an intra-outer housing tube 10 is formed in the outer housing 5. The upper-stage annular ditch 7 is always communicating with an external control unit (for example, a hydraulic cylinder), which is not shown, via the annular tube 10. The inner pressure of the annular ditch 7 is equal to that in the control unit.

In the inner housing 6, four upper control channels 13 are formed at intervals of 90°. Particularly, the upper control channels 13 are facing mutually so as to be symmetrical with respect to the center of the small-diameter hollow 6b. The small-diameter hollow 6b communicates with the annular ditch 7 via the upper control channels 13. Four return channels 14 are formed counterclockwise off the respective upper control channels 13.

As shown in FIG. 3, an intra-outer housing tube 11 is formed in the outer housing 5. The middle-stage annular ditch 8 is always communicating with an external pressurizer (for example, hydraulic pump), which is not shown, via the tube 11. The internal pressure of the annular ditch 8 is therefore equal to the pressure in the pressurizer.

In the inner housing 6, four pressure channels 15 are formed at intervals of 90°. Particularly, the pressure channels 15 are facing mutually so as to be symmetrical with respect to the center of the small-diameter hollow 6b. The small-diameter hollow 6b in the inner housing 6 communicates with the annular ditch 8 via the pressure channels 15. Four lower control channels 16 are formed clockwise off the respective pressure channels 15.

As shown in FIG. 4, an intra-outer housing tube 12 is formed in the outer housing 5. The lower-stage annular ditch 9 is always communicating with an external reservoir (for example, oil reservoir tank), which is not shown, via the tube 12. The internal pressure of the annular ditch 9 is therefore equal to the pressure in the reservoir.

As shown in FIGS. 2 to 4, intra-inner housing communicating holes 17 and 18, which extend along the axial lines of the hollows 6a and 6b (vertically in FIG. 2), are formed in the inner housing 6. The return channels 14 are always communicating with the lower-stage annular ditch 9 via the intra-inner housing communicating holes 17. The lower control channels 16 are always communicating with the upper-stage annular ditch 7 via the intra-inner housing communicating holes 18.

As mentioned above, in this embodiment, the upper control channels 13, return channels 14, pressure channels 15, and lower control channels 16 serve as the communicating channels in a housing.

As shown in FIGS. 2 and 3, a cross-shaped upper through hole 21 whose ports are opposed to the ports of the respective upper control channels 13 (II—II cross section of FIG. 1) and a cross-shaped lower through hole 22 whose ports are opposed to the ports of the respective pressure channels 15 (III—III cross section of FIG. 1) are formed in two stages in the guide valve 2. The shape of a cross provides a multiplied total aperture area for each rotation angle. Despite the compact design, the rotary flow control valve can control a large amount of fluid. The through holes 21 and 22 serve as the switch channels in a valve.

The upper control channels 13 in the inner housing are always coupled with the cross-shaped upper through hole 21. The internal pressure of the upper through hole 21 is held the same as the pressure in the control unit transmitted through the intra-outer housing tube 10. In the neutral state shown in FIG. 2, the return channels 14 and upper through hole 21 are mutually decoupled. The return channels 14 and upper through hole 21 communicate with one another via a minute clearance 23 created between the inner housing 6 and guide valve 2.

The pressure channels 15 in the inner housing 6 are always coupled with the cross-shaped lower through hole 22. The internal pressure of the lower through hole 22 is held the same as the pressure in the pressurizer transmitted through the intra-outer housing tube 11. In the neutral state in FIG. 3, the lower control channels 16 and lower through hole 22 are mutually decoupled. The lower control channels 16 and lower through hole 22 communicate with one another through the clearance 23.

As shown in FIGS. 2 and 3, four small-diameter communicating holes 24 extend along the axial line L of the guide valve 2 in the guide valve 2. As shown in FIG. 1, supporting spaces 25 and 26 are formed between the guide valve 2 and upper bearing 19, and between the guide valve 2 and lower bearing 20. These supporting spaces 25 and 26 communicate with each other via the small-diameter communicating holes 24. The internal pressures of the supporting spaces 25 and 26 are held the same.

As shown in FIG. 1, O-rings 27, 28, and 29 are locked in the junctions between the upper plate 45 and guide valve 2, the upper plate 45 and inner housing 6, and the inner housing 6 and lower plate 46. The O-rings 27, 28, and 29 seal the junctions airtightly.

A wave washer 30 is placed in the space between the bottom of the guide valve 2 and the lower plate 46. Force oriented upward in FIG. 1 is always applied to the guide valve 2 owing to the pressing force of the wave washer 30. The pressing force suppresses the vertical deflection occurring when the guide valve 2 rotates. The lower plate 46 has paths (not shown) through which the lower space 26 of the guide valve 2 communicates with the return channels 14. Microscopic dust is fed to a tank through the paths. As shown in FIGS. 2 to 4, mounting holes 47 for use in mounting the rotary flow control valve 1 in any apparatus are bored at four corners of the outer housing 5.

Figure 5:
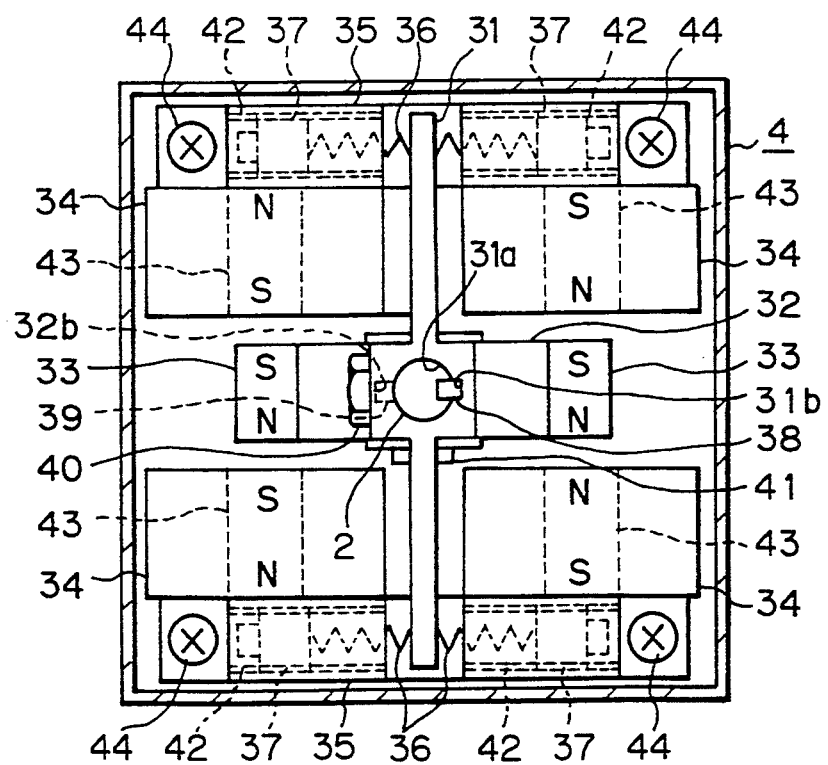
FIG. 5 shows an I—I cross section of FIG. 1.

In the torque motor 3 shown in FIGS. 1 and 5 (showing the I—I cross section of FIG. 1), round holes 31a and 32a as well as key ditches 31b and 32b are bored in the centers of an upper armature 31 which is shaped substantially like a bar and of a lower armature 32 which is shaped substantially like a plate. The upper end of the guide valve 2 is inserted into the round holes 31a and 32a. Keys 38 and 39 are fitted into the key ditches 31b and 32b. The armatures 31 and 32 are secured to the guide valve 2 with screws 40 and 41. In other words, the upper and lower armatures 31 and 32 serving as rotary members extend in directions perpendicular to the axial line of the guide valve 2. The upper and lower armatures 31 and 32 therefore rotate together with the guide valve 2.

Permanent magnets 33 are attached symmetrically to both ends of the lower armature 32, which are located away from the rotation center of the lower armature 32, using an adhesive. The different magnetic poles of the permanent magnets 33 are lined up in a direction perpendicular to the longitudinal direction of the lower armature 32 (vertically in FIG. 5). In this embodiment, as shown in FIG. 5, the upper poles are south-seeking and the lower poles are north-seeking.

Each of yokes 35 made of a magnetic material has cases 42 that are rectangular parallelepipeds, and cylinders 43 projecting from one side surfaces of the cases 42 and serving as magnetic members. The yokes 35 are arranged so that the south and north magnetic poles of the permanent magnets 33 will be opposed to the cylinders 43 of the yokes 35. A coil 34 is wound about each of the cylinders 43. When the coils 34 are energized, magnetic poles (south and north poles) occur at both ends of the cylinders 43. The end surfaces of the cylinders 43 are opposed to the end surfaces of the coils 34.

Figure 15:
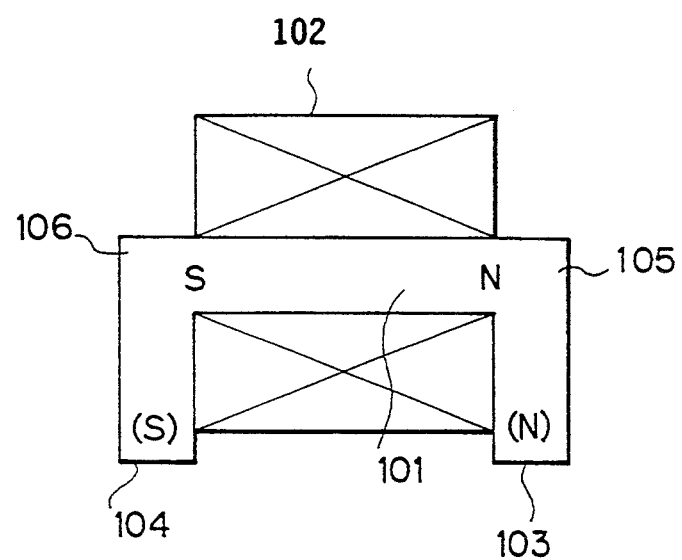
FIG. 15 shows a coil and a yoke for comparison.

FIG. 15 shows a prior art for comparison. In FIG. 15, a coil 102 is wound about a yoke 101 whose cross section is shaped substantially like a bracket. The end surfaces 103 and 104 of the yoke 101 provide magnetic poles. In this structure, when the coil 102 is energized, a large magnitude of magnetic flux leaks out of corners 105 and 106. Only a limited magnitude of magnetic flux reaches the magnetic poles at which magnetic flux is needed. Thus, the magnitude of usable magnetic flux is limited despite the large design. Consequently, a generated magnetic force is small.

In the aforesaid structure, magnetic flux is routed through the corners 105 and 106 to the magnetic poles at which the magnetic flux is needed. In contrast, in the structure of this embodiment, the end surfaces of the coils 34 are opposed to those of the cylinders 43 as shown in FIG. 5. The whole magnetic flux can therefore be utilized effectively to generate magnetic force. In other words, the leakage of magnetic flux can be minimized and a large torque can be provided despite the compact design. The magnetic poles of the permanent magnets 33 and coils 34 are arranged substantially linearly. The magnetic fields induced by the magnetic poles are therefore quite uniform. The operating range of the lower armature 32 is within the small portion of a magnetic field induced by the coils 34 in the vicinity of the center of the magnetic field. The variation in the magnetic field within the operating range is quite limited, which leads to the improved linearity in the rotation angle of the lower armature 32 relative to an applied current value. That is to say, the rotation angle of the guide valve 2 exhibits excellent linearity irrespectively of an applied current value. This results in the superb proportionality of a controlled flow rate to an applied current.

The magnetic poles are determined with the orientation of input current applied to the coils 34. If the magnetic poles of the cylinders 43 opposed to the south poles (or north poles) of the permanent magnets 33 are north-seeking (or south-seeking), attraction is produced between the permanent magnets 33 and cylinders 43. If the magnetic poles of the cylinders 43 opposed to the south poles (or north poles) of the permanent magnets 33 are south-seeking (or north-seeking), repulsion is produced between the permanent magnets 33 and cylinders 43. When the magnetic poles of the cylinders 43 are as shown in FIG. 5, the lower armature 32 rotates counterclockwise in FIG. 5 with the axial line of the guide valve 2 as a center. The torque of the lower armature 32 is proportional to the electrical size of applied current.

Screw holes penetrate through the rectangular parallelepipeds 42. Adjusting screws 37 are fitted to the screw holes. Right and left springs 36 clamp the upper armature 31. The right and left springs 36 provide a pressing force of the same strength. The pressing forces of the springs 36 restrict the rotations of the armatures 31 and 32. When the coils 34 are de-energized, the guide valve 2 is held at the neutral position together with the armatures 31 and 32. When the coils 34 are energized, the guide valve 2 rotates together with the armatures 31 and 32. The armatures 31 and 32 are stopped rotating at positions at which the torques of the armatures 31 and 32 are balanced with the pressing forces of the springs. When the adjusting screws 37 are used to adjust the pressing forces of the right and left springs 36, the neutral position of the guide valve 2 coupled with the armatures 31 and 32 can be adjusted.

Figure 6:
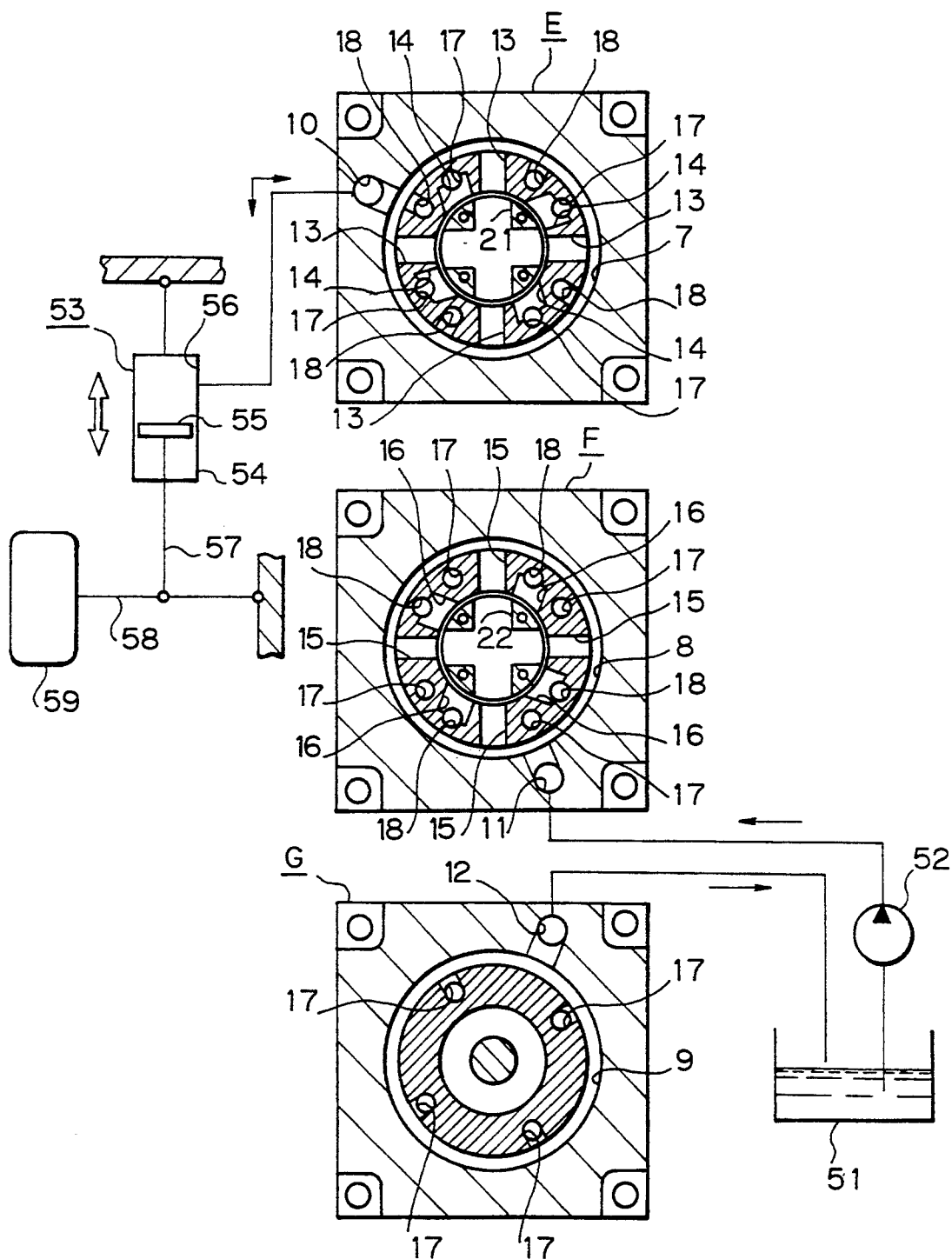
FIG. 6 shows a hydraulic circuit in an active suspension system for a vehicle having a rotary flow control valve.

FIG. 6 shows a hydraulic circuit in an active suspension system for a vehicle having a rotary flow control valve having the aforesaid structure. In FIG. 6, a section E is a II—II cross section of the rotary flow control valve 1 (identical to FIG. 2). A section F is a III—III cross section thereof (identical to FIG. 3). A section G is a IV—IV cross section thereof (identical to FIG. 4).

As shown in FIG. 6, a hydraulic pump 52 is mounted in an oil reservoir tank 51. A hydraulic actuator 53 for an active suspension includes a hydraulic cylinder 54 and a piston 55. The piston 55 reciprocates depending on the amount of oil and oil pressure in a cylinder chamber 56. A piston rod 57 coupled with the piston 55 is connected to an arm 58. A tire 59 is attached to the tip of the arm 58.

The hydraulic pump 52 is connected to the intra-outer housing tube 11 in the rotary flow control valve 1 (F in FIG. 6). The pressures in the middle-stage annular ditch 8, which is always coupled with the tube 11, pressure channels 15, and lower through hole 22 are the same as the pressure in the hydraulic pump 52.

The cylinder chamber 56 in the hydraulic actuator 53 is connected to the intra-outer housing tube 10 in the rotary flow control valve 1 (E in FIG. 6). The pressures in the upper-stage annular ditch 7, which is always coupled with the tube 10, upper control channels 13, and upper through hole 21 are the same as the pressure in the cylinder chamber 56. The upper-stage annular ditch 7 always communicates with the lower control channels 16 in the section F via the intra-inner housing communicating channels 18. The pressures in the communicating channels 18 and lower control channels 16 are also the same as the pressure in the cylinder chamber 56.

The oil reservoir tank 51 is connected to the intra-outer housing tube 12 in the rotary flow control valve 1 (G in FIG. 6). The pressure in the lower-stage annular ditch 9, which is always coupled with the tube 12, is the same as the pressure in the oil reservoir tank 51. The lower-stage annular ditch 9 always communicates with the return channels 14 in the section E via the intra-inner housing communicating channels 17. The pressures in the intra-inner housing communicating channels 17 and return channels 14 are also the same as the pressure in the oil reservoir tank 51.

The operation of the rotary flow control valve 1 will be described by giving an example of the active suspension system for a vehicle in FIG. 6.

To begin with, input current oriented in a certain direction is applied to the coils 34 in FIG. 5. Magnetic poles occur in the cylinders 43 in the yokes 35. Attraction and repulsion are then produced between the magnetic poles of the cylinders 43 and those of the permanent magnets 33 attached to both ends of the lower armature 32 using an adhesive. The attraction and repulsion cause the lower armature 32 to rotate with the axial line L of the guide valve 2 as a center. The torque of the lower armature 32 is proportional to the electrical size of the input current. The lower armature 32 stands still at a position at which the torque is balanced with the pressing forces of the springs 36. The total area shared by the communicating channels in the guide valve 2; that is, a flow rate is determined depending on the standstill position.

Figure 7:
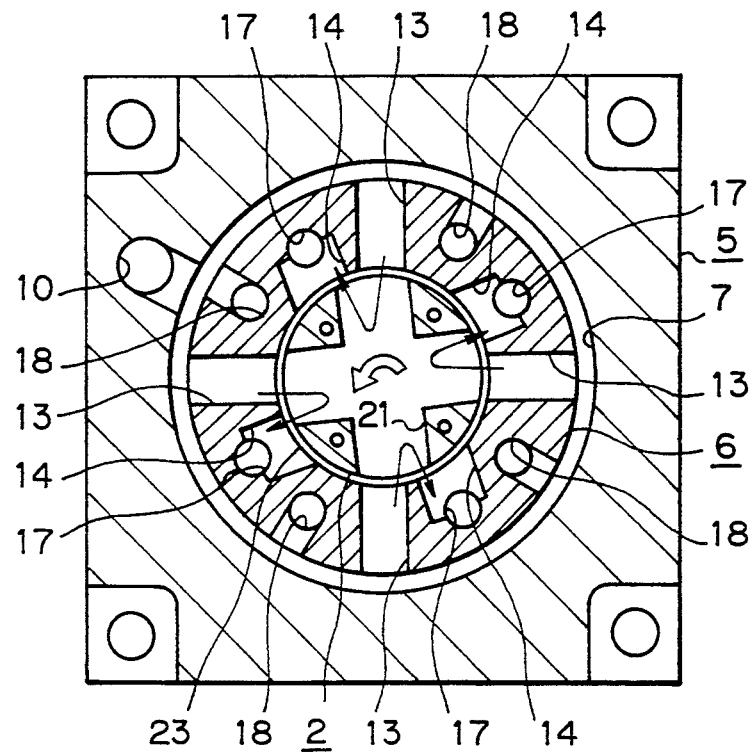
FIG. 7 is a cross-sectional view showing the operation of the rotary flow control valve.
Figure 8:
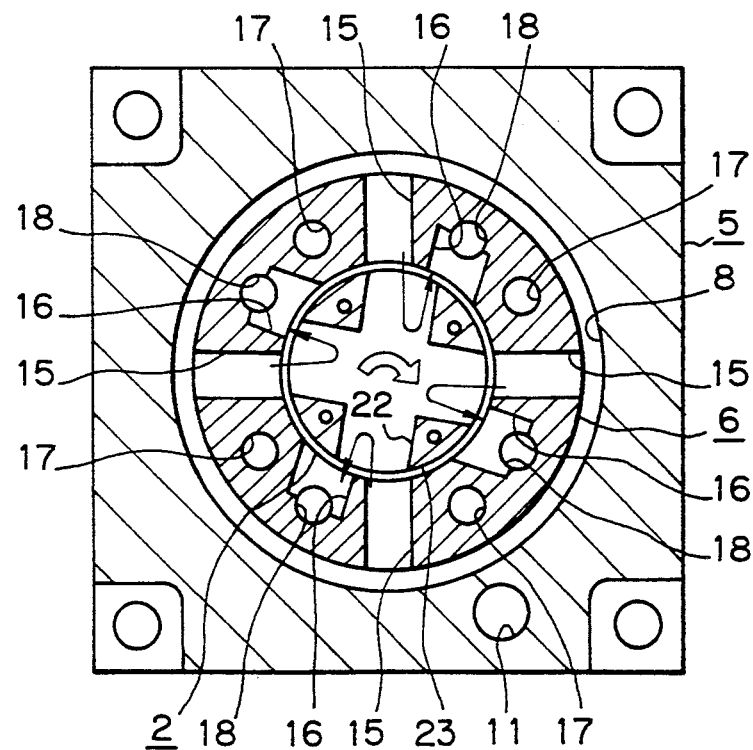
FIG. 8 is a cross-sectional view showing the operation of the rotary flow control valve.

FIG. 7 shows a II—II cross section of FIG. 1, wherein the guide valve 2 rotates counterclockwise. FIG. 8 shows a III—III cross section of FIG. 1, wherein the guide valve 2 rotates clockwise.

As shown in FIG. 8, when the guide valve 2 rotates clockwise, the pressure channels 15 and lower control channels 16 are canalized by the lower through hole 22 in the guide valve 2 to an extent that is determined by the rotation angle, and thus communicate with one another. The internal pressures of the pressure channels 15 and lower through hole 22 are held the same as the pressure of the hydraulic pump 52. Oil therefore flows by the amount determined by the total aperture from the pressure channels 15 into the lower control channels 16 via the lower through hole 22. When the guide valve 2 rotates clockwise, the lower through hole 21 and return channels 14 are kept decoupled.

In the active suspension system in FIG. 6, oil pumped up from the oil reservoir tank 51 by the hydraulic pump 52 flows through the intra-outer housing tube 11, middle-stage annular ditch 8, pressure channels 15, lower through hole 22, lower control channels 16, intra-inner housing communicating channels 18, upper-stage annular ditch 7, and intra-outer housing tube 10 in the rotary flow control valve 1. The oil is then fed to the cylinder chamber 5 in the hydraulic actuator 53. With the feed of oil to the cylinder chamber 56, the amount of oil and oil pressure in the cylinder chamber 56 increase to lower the piston 55.

When input current of the coils 34 is reversed in polarity, the cylinders 43 of the yokes 35 assume an opposite magnetic characteristic. The lower armature 32 then rotates counterclockwise (the guide valve 2 rotates counterclockwise).

As shown in FIG. 7, the upper control channels 13 and return channels 14 are canalized by the upper through hole 21 in the guide valve 2 to an extent that is determined by the rotation angle of the guide valve 2, and thus communicate with one another. The internal pressures of the upper control channels 13 and upper through hole 21 are held the same as the pressure of the cylinder chamber 56. Oil therefore flows by the amount determined by the total aperture from the upper control channels 13 to the return channels 14 via the upper through hole 21. When the guide valve 2 rotates counterclockwise, the lower through hole 22 and lower control channels 16 are kept decoupled.

In FIG. 6, oil in the cylinder chamber 56 flows through the intra-outer housing tube 10, upper-stage annular ditch 7, lower control channels 13, upper through hole 21, return channels 14, intra-inner housing communicating channels 17, lower annular ditch 9, and intra-outer housing tube 12 in the rotary flow control valve 1. The oil is then discharged from the intra-outer housing tube 12 to the oil reservoir tank 51. With the return of oil from the cylinder chamber 56 to the oil reservoir tank 51, the amount of oil and oil pressure in the cylinder chamber 56 decrease to raise the piston 55.

When an input current to be fed to the coils 34 is zero, the torque of the lower armature 32 becomes nil. With the pressing forces of the springs 36, the guide valve 2 returns to the neutral position (FIGS. 2 and 3). The upper and lower through holes 21 and 22 are decoupled from the return channels 14 and lower control channels 16. In this state, the inflow or outflow of oil to or from the cylinder chamber 56 is stopped.

In the active suspension system for a vehicle in FIG. 6, if the orientation and electrical size of input current to be fed to the coils 34 are controlled according to the parameters indicating a state of a road surface and a running state, the stroke of the suspension can be readily adjusted. A position of a vehicle or vibrations in a vehicle can be actively controlled.

As described so far, in the rotary flow control valve 1 of this embodiment, the upper armature 31 and lower armature 32 serving as rotary members extend in the directions perpendicular to the axial line L of the guide valve 2 (See FIG. 1). The upper and lower armatures 31 and 32 can rotate together with the guide valve 2. The permanent magnets 33 are fixed at both ends of the lower armature 32; that is, at the positions away from the rotation center of the guide valve 2. The cylinders 43 about which the coils 43 are wound are opposed to the north and south magnetic poles of the permanent magnets.

When the coils 34 are energized, attraction and repulsion occur between the magnetic poles occurring in the cylinders 43 and the magnetic poles of the permanent magnets 33. This causes the guide valve 2 to rotate forward or in reverse. With the rotation of the guide valve 2, the communicating channels in the inner housing 6 (upper control channels 13, return channels 14, pressure channels 15, and lower control channels 16), and the through holes 21 and 22 in the guide valve 2 are canalized selectively. The rotation angle of the guide valve 2 can be adjusted according to the electrical size of input current to be fed to the coils 34. The total area shared by any of the groups of communicating channels 13 to 16 and either of the through holes 21 and 22 can thus be varied to control a flow rate. These components of the guide valve 2 provide improved vibration proofing.

In the aforesaid structure, the magnetic poles of the permanent magnets 33 are opposed to those occurring on the end surfaces of the cylinders 43 (magnetic members) due to the coils 34. The whole of magnetic flux can be utilized to generate magnetic force. Despite the compact design, a large torque can be made available. According to the aforesaid structure, the magnetic poles occurring in the permanent magnets 33 and coils 34 are arranged substantially linearly. The distribution of magnetic fields induced by the magnetic poles becomes quite uniform. The operating range of the armature 31 or 32 is within the small portion of a magnetic field, which is induced by the magnetic poles occurring in the coils 34, in the vicinity of the center of the magnetic field. The variation in the magnetic field within the operating range is therefore limited, which results in the improved linearity of the rotation angle of the armature 31 or 32 relative to an applied current value. In other words, the rotation angle of the guide valve 2 demonstrates excellent linearity irrespectively of an applied current value, which leads to the improved proportionality of a controlled flow rate to an applied current value.

As mentioned above, according to this embodiment, the rotary flow control valve can be designed compactly, and the vibration proof, response speed, and proportionality of a controlled flow rate to an applied current value can be improved.

Four communicating channels (13, 14, 15, or 16) formed in the inner housing are symmetrical with respect to the rotation center of the guide valve 2. This arrangement contributes to the minimized fluid pressure applied in the radial direction of the guide valve 2. The pressures with which fluid is distributed to respective communicating channels in the same stage are therefore well-balanced, which enables the guide valve 2 to operate smoothly. That is to say, when four communicating channels in the same stage are formed asymmetrically, the fluid pressure is asymmetric. The guide valve 2 is then pushed against the inner wall of the housing. This may lead to rotation failure. This embodiment resolves this drawback.

The guide valve 2 is borne by the two bearings 19 and 20. The small-diameter communicating holes 24, via which supporting spaces 25 and 26 for the bearings 19 and 20 communicate with each other, extend in the longitudinal direction of the guide valve 2. The pressure in the upper supporting space 25 in the guide valve 2 shown in FIG. 1 is therefore equal to that in the lower supporting space 26. This minimizes the pressure applied vertically to the guide valve 2.

The upper and lower bearings 19 and 20 are located the hollows 6a and 6b in the inner housing 6. Unlike a prior art in which bearings are inserted into bearing receivers (for example, upper and lower plates 45 and 46) that are provided separately from a housing, an error in mounting precision will not occur. In a conventional flow control valve, an error in mounting precision causes hydraulic lock, and brings about an operation failure with the application of a high pressure. This embodiment can avoid this drawback and guarantee smooth operation all the time. According to the aforesaid structure, the clearance 23 between the guide valve 2 and the inner wall of the inner housing 6 can be further reduced to minimize an amount of oil leaking out to the reservoir.

Next, variants of the first embodiment (second to sixth embodiments) will be described.

Second embodiment

In the first embodiment, as shown in FIGS. 1 to 3, the upper control channels 13, return channels 14, and lower control channels 16, which serve as the communicating channels in a housing, are provided in fours in the inner housing 6. The cross-shaped through holes 21 and 22 serving as the switch channels in a valve are formed in the guide valve 2 so that their ports will be opposed to the ports of the channels 13 to 16.

Figure 9:
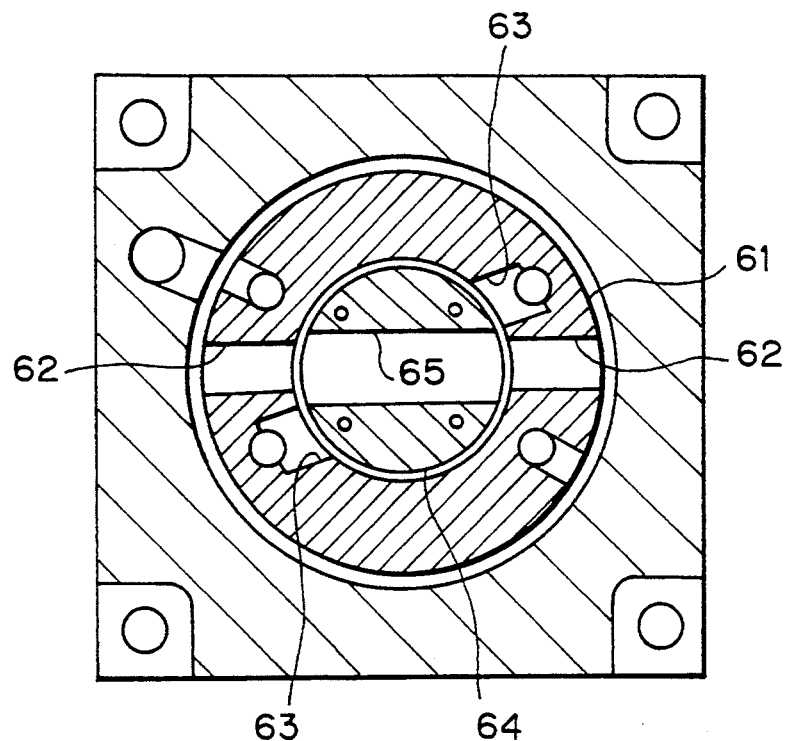
FIG. 9 is a cross-sectional view showing the structure of the rotary flow control valve of the second embodiment.
Figure 10:
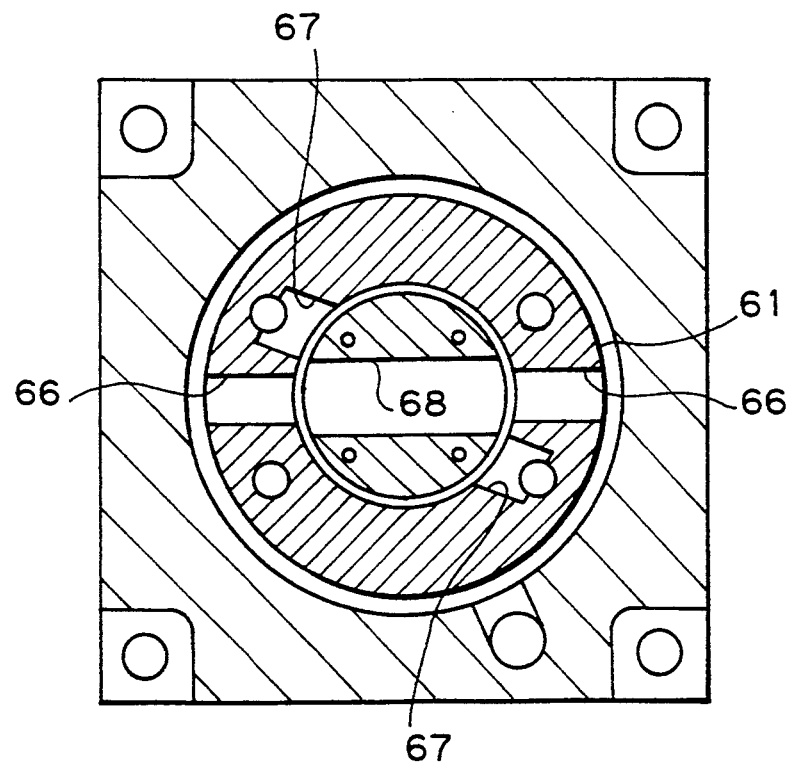
FIG. 10 as well as FIG. 9 is a cross-sectional view showing the structure of the rotary flow control valve of the second embodiment.

FIGS. 9 and 10 show the II—II cross section and III—III cross section of a rotary flow control valve of the second embodiment.

As shown in FIG. 9, two upper control channels 62 are opposed to each other at symmetrical positions in an inner housing 61. Return channels 63 are formed counterclockwise off the upper control channels 62. An upper through hole 65 extending linearly is formed in a guide valve 64.

As shown in FIG. 10, two pressure channels 66 are opposed to each other at symmetrical positions in the inner housing 61. Lower control channels 67 are formed counterclockwise off the pressure channels 66. A lower through hole 68 extending linearly is formed in the guide valve 64.

In the second embodiment, the upper control channels 62, return channels 63, pressure channels 66, and lower control channels 67 serve as the communicating channels in a housing, while the upper through hole 65 and lower through hole 68 serve as the switch channels in a valve.

In a rotary flow control valve having the aforesaid components, when the guide valve 64 rotates counterclockwise in FIG. 9, the upper control channels 62 and return channels 63 communicate with one another via the upper through hole 65. When the guide valve 64 rotates clockwise in FIG. 10, the pressure channels 66 and lower control channels 67 communicate with one another via the lower through hole 68. As a result, the rotary flow control valve of the second embodiment can provide the same advantages as the rotary flow control valve 1 of the first embodiment.

The number of communicating channels formed in a housing is not limited to the value in the first or second embodiment. Any even number of communicating channels can be formed as long as they are symmetrical with respect to the rotation center of the guide valve.

Third embodiment

In the first embodiment, as shown in FIGS. 1 to 3, the upper through hole 21 and lower through hole 22 serving as the switch channels in a valve are formed in two stages up and down in the guide valve 2. The upper through hole 21 enables the upper control channels 13 and return channels 14 to communicate with one another. The lower through hole 22 enables the pressure channels 15 and lower control channels 16 to communicate with one another. Even in the second embodiment, the through holes 65 and 68 are formed in two stages up and down in the guide valve 64.

Figure 11:
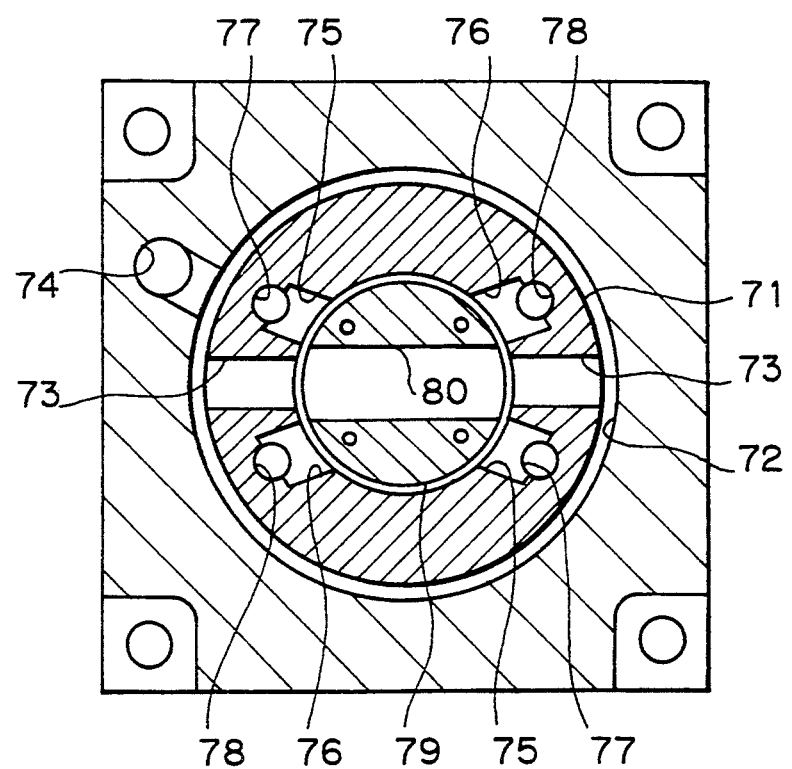
FIG. 11 is a cross-sectional view showing the structure of a rotary flow control valve of the third embodiment.
Figure 12:
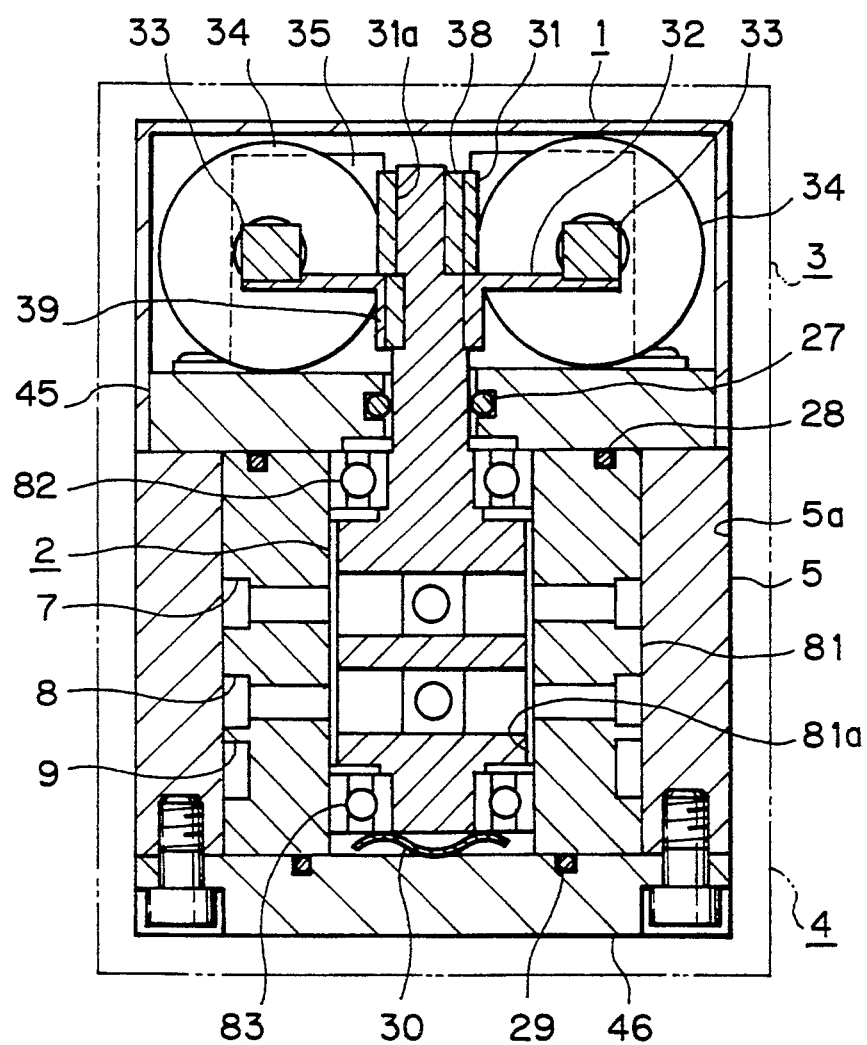
FIG. 12 is a longitudinal-sectional view showing the components of a rotary flow control valve of the fourth embodiment.

In contrast, in the third embodiment, an annular ditch 72 is formed in an inner housing 71 as shown in FIG. 11. Two control channels 73 are coupled with the annular ditch 72. The annular ditch 72 communicates with an external control unit (for example, the cylinder chamber 56 in FIG. 6) via an intra-outer housing tube 74.

In the inner housing 71, a pair of pressure channels 75 are formed clockwise off the control channels 73 in FIG. 11. A pair of return channels 76 are formed counterclockwise off the control channels 73 in FIG. 11. The pressure channels 75 are coupled with intra-inner housing communicating holes 77. The communicating holes 77 communicate with an external pressurizer (for example, the hydraulic pump 52 in FIG. 6) via a tube which is not shown. The return channels 76 are coupled with intra-inner housing communicating holes 78. The communicating holes 78 communicate with an external reservoir (for example, the oil reservoir tank 51 in FIG. 6) via a tube which is not shown.

A through hole 80 extending linearly alone is formed in a guide valve 79. In the neutral state in FIG. 11, only the control channels 73 and through hole 80 communicate with one another.

In the third embodiment, the control channels 73, pressure channels 75, and return channels 76 serve as the communicating channels in a housing, while the through hole 80 serves as the switch channel in a valve.

When the guide valve 79 rotates clockwise from the neutral position owing to the torque motor 3 (See FIG. 1), the pressure channels 75 and control channels 73 communicate with one another via the through hole 80. Oil then flows from the pressurizer (not shown) through the intra-inner housing communicating holes 77, pressure channels 75, through hole 80, control channels 73, annular ditch 72, and intra-outer housing channels 74, to the control unit (not shown).

On the other hand, when the guide valve 79 rotates counterclockwise from the neutral position, the control channels 73 and return channels 76 communicate with one another via the through hole 80. Oil then flows from the control unit (not shown), through the intra-outer housing channels 74, annular ditch 72, control channels 73, through hole 80, return channels 76, and intra-inner housing communicating holes 78, to the reservoir (not shown).

As mentioned above, in the third embodiment, only the through hole 80 is formed in the guide valve 79. Nevertheless, similarly to the first embodiment, the third embodiment makes it possible to canalize desired channels and control a flow rate.

Fourth embodiment

In the first embodiment, as shown in FIG. 1, the large-diameter hollow 6a and small-diameter hollow 6b are formed as a cylindrical space in the inner housing 6.

The bearing 19 is located in the large-diameter hollow 6a, and the guide valve 2 and bearing 20 are located in the small-diameter hollow 6a. In other words, the cylindrical space in the inner housing 6 has a stepped structure.

In contrast, in the fourth embodiment, a cylindrical space 81a in an inner housing 81 is shaped like a right cylinder without a step. A pair of bearings 82 and 83 are locked in the cylindrical space 81a. The guide valve 2 is borne by the bearings 82 and 83.

In the first embodiment, it is required that the large-diameter hollow 6a and small-diameter hollow 6b must exist coaxially. In the fourth embodiment, since the diameter of the cylindrical space is unchanged, consideration need not be taken into whether two hollows are exactly coaxial. This simplifies machining and provides high precision.

This results in the small clearance between the guide valve 2 and the inner wall of the inner housing 81. This means that when the guide valve is at the neutral position, only a limited leakage of oil flows out to the return channels.

Fifth embodiment

In the first embodiment, as shown in FIG. 5, the torque motor 4 consists of the upper armature 31 and lower armature 32 serving as the rotary members.

Figure 13:
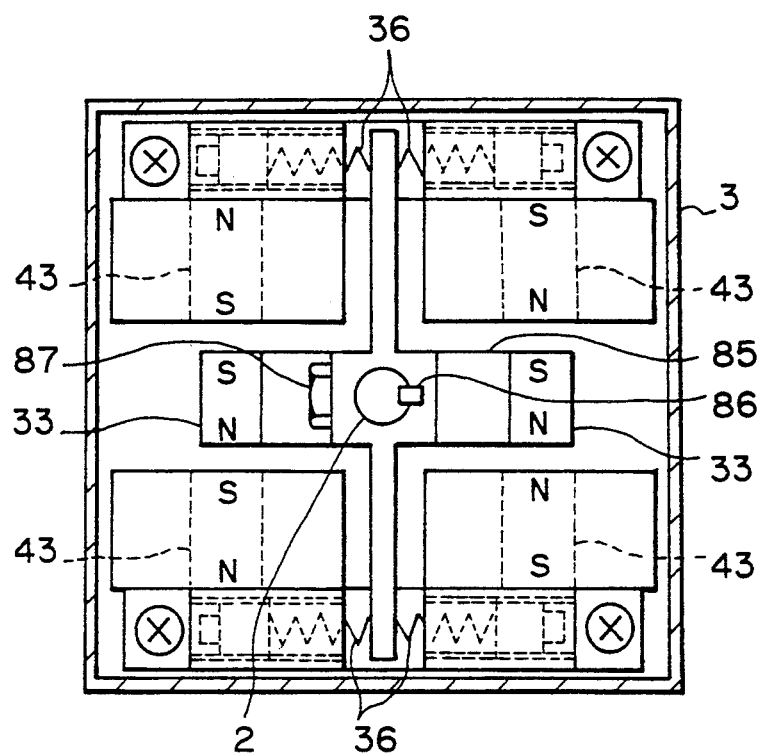
FIG. 13 is a longitudinal-sectional view showing the structures of a rotary flow control valve of the fifth embodiment.

In contrast, in the fifth embodiment, an armature 85 serving as a rotary member is, as shown in FIG. 13, a cross-shaped member made by uniting the upper and lower armatures 31 and 32. The armature 85 is coupled with the guide valve 2 using a key 86 and a screw 87 in the center of the cross. The permanent magnets 33 are attached to the right and left ends of the armature 85 with an adhesive. The springs 36 are attached to the right and left sides of the upper and lower ends of the armature 85.

According to the foregoing structure, similarly to the first embodiment, when the coils 34 are energized, attraction and repulsion are produced between the permanent magnets 33 and cylinders 43. With the effects of the attraction and repulsion, the armature 85 rotates forward or reversely. When the torque of the armature 85 is balanced with the pressing forces of the springs 36, the armature 85 stands still.

As mentioned above, the fifth embodiment can achieve the object of the present invention and realize the simplified armature 85.

Sixth embodiment

In the embodiments relating to the first mode, as shown in FIG. 5, a magnetic circuit is composed of the permanent magnets 33 attached to the ends of the lower armature 32, and the yokes 35 to which the coils 34 are fixed. The lower armature 32 rotates together with the permanent magnets 33 with the axial line L of the guide valve 2 (See FIG. 1) as a center.

Figure 14:
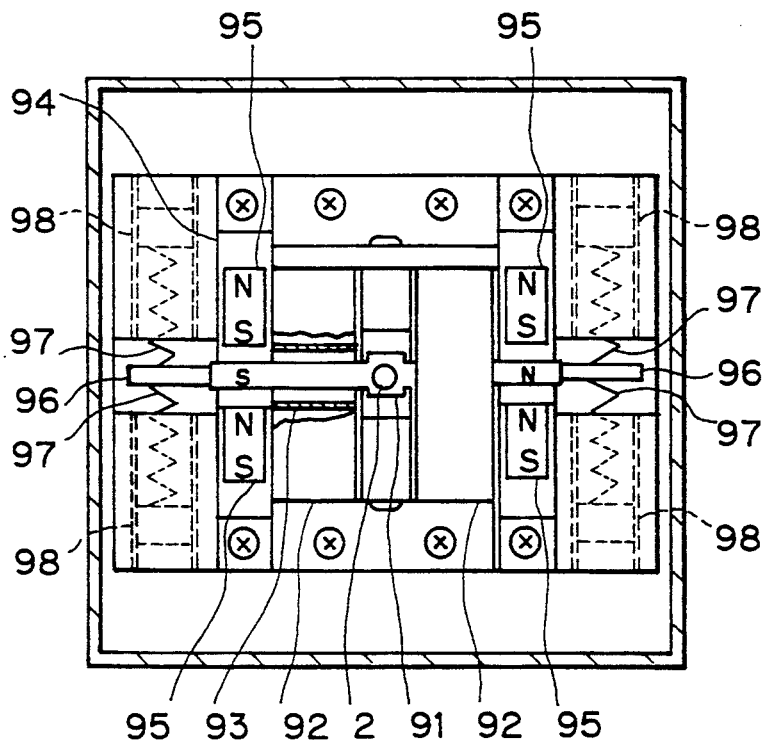
FIG. 14 is a longitudinal-sectional view showing the structure of a rotary flow control valve of the sixth embodiment.

In contrast, in the sixth embodiment that provides a rotary flow control valve relating to the second mode, an armature 91, which is made of a magnetic substance and serves as a rotary member, is shaped substantially like a bar as shown in FIG. 14. The armature 91 is coupled with the guide valve 2 in the center thereof. A pair of coils 92 are located in the right and left parts of the guide valve 2. The armature 91 is penetrating through bobbins 93 of the coils 92.

Yokes 94 are located in the vicinities of the ends of the armature 91. Two permanent magnets 95 are fixed to each of the yokes 94. The upper magnetic poles in a total of the four permanent magnets 95 in FIG. 14 are north-seeking, while the lower magnetic poles are south-seeking. The armature 91 is interposed between the permanent magnets 95.

Stationary chips 96 that are non-conducting members are coupled with the distal ends of the armature 91. The stationary chips 96 are supported by springs 97 that are located with the armature 91 between them in the rotating direction of the armature. The rotation of the armature 91 is therefore restricted with the pressing forces of the springs 97. The pressing forces of the springs 97 can be adjusted using adjusting screws 98. The neutral position of the armature 91 can therefore adjusted using the adjusting screws 98.

When the coils 92 are energized, north and south magnetic poles occur at the right and left ends of the armature 91 penetrating through the coils 92. Owing to the magnetic poles in the armature 91 and those in the permanent magnets 95 opposed to the armature 91, attraction and repulsion are produced between the armature 91 and permanent magnets 95. The armature 91 therefore has a torque proportional to the electrical size of input current. In FIG. 14, the left end of the armature 91 is south-seeking and the right end thereof is north-seeking. The armature 91 therefore rotates counterclockwise in FIG. 14. When the torque of the armature 91 is balanced with the pressing forces of the springs 97, the armature 91 stands still.

As mentioned above, in the sixth embodiment, the permanent magnets 95 are stationary, while the magnetic poles in the armature 91 are variable. With this structure, the sixth embodiment as well as the previous embodiments can achieve the object of the present invention.

The present invention has an excellent advantage that a rotary flow control valve can be designed compactly, and the vibration proofing, response speed, and proportionality of a controlled flow rate to an applied current value can be improved.

We claim:

1. A rotary flow control valve comprises:
   a housing having a cylindrical space and a plurality of communicating channels extending from the side wall of the housing and communicating with the cylindrical space;
   a valve located in the cylindrical space and provided with switch channels for selectively canalizing the communicating channels in the housing;
   bearings located in the cylindrical space and bearing the valve so that the valve can rotate forward or in reverse with respect to the axial line thereof;
   rotary members coupled with the valve and extended in directions perpendicular to the axial line of the valve;
   magnets located away from the rotation center on one of the rotary members;
   magnetic members opposed to the magnetic poles of the magnets; and
   coils that are wound about the magnetic members and change the magnetic poles and forces of the magnetic members according to the orientation and electrical size of applied current, wherein attraction and repulsion are produced between the magnetic members and magnets in order to rotate the rotary members.

2. A rotary flow control valve according to claim 1, wherein there are further provided an even number of channels communicating with the cylindrical space in the housing so as to be arranged symmetrically with respect to the rotation center of the valve.

3. A rotary flow control valve according to claim 1, wherein the cylindrical space in the housing has the same diameter throughout the axial line.

4. A rotary flow control valve according to claim 1, wherein the valve is borne by at least two bearings and supporting spaces in which the bearings are supported and which communicate with each other via the communicating channels formed in the valve.

5. A rotary flow control valve comprises:
   a housing having a cylindrical space and a plurality of communicating channels extending from the side wall of the housing and communicating with the cylindrical space;
   a valve 2 located in the cylindrical space and provided with switch channels for selectively canalizing the communicating channels in the housing;
   bearings located in the cylindrical space and bearing the valve so that the valve can rotate forward or in reverse with the axial line thereof as a center;
   a rotary member coupled with the valve, extended in a direction perpendicular to the axial line of the valve, and made of a magnetic substance;
   coils through which the rotary member penetrates in a hollow and that change the magnetic poles and force of the rotary member according to the orientation and electrical size of applied current; and
   magnets opposed to the magnetic poles of the rotary member, wherein attraction and repulsion are produced between the rotary member and magnets, thus rotating the rotary member.

6. A rotary flow control valve according to claim 5, wherein there are further provided an even number of channels communicating with the cylindrical space in the housing so as to be arranged symmetrically with respect to the rotation center of the valve.

7. A rotary flow control valve according to claim 5, wherein the cylindrical space in the housing has the same diameter throughout the axial line.

8. A rotary flow control value according to claim 5, wherein the valve is borne by at least two bearings and supporting spaces in which the bearings are supported and which communicate with each other via the communicating channels formed in the valve.

* * * * *